US005903970A

United States Patent [19]
Pittau

[11] Patent Number: 5,903,970
[45] Date of Patent: May 18, 1999

[54] MACHINE FOR CONNECTING CONNECTION ELEMENTS INTO CONNECTORS

[75] Inventor: Serge François Pittau, Aubagne, France

[73] Assignee: Eurocopter France, Marignane, France

[21] Appl. No.: 08/899,225

[22] Filed: Jul. 23, 1997

Related U.S. Application Data

[60] Continuation of application No. 08/583,271, Jan. 5, 1996, abandoned, which is a division of application No. 08/327, 299, Oct. 21, 1994, Pat. No. 5,504,990.

[30] Foreign Application Priority Data

Oct. 22, 1993 [FR] France .................................. 93 12615

[51] Int. Cl.[6] ............................ H01R 43/20; B23P 19/04

[52] U.S. Cl. ............................ 29/748; 29/33 M; 29/721; 29/754; 29/759

[58] Field of Search .................................. 29/33 M, 747, 29/748, 754, 755, 759, 720, 721, 709

[56] References Cited

U.S. PATENT DOCUMENTS

| | | | |
|---|---|---|---|
| 3,781,985 | 1/1974 | Yonkers | 29/754 X |
| 4,433,476 | 2/1984 | Bailey et al. | 29/754 X |
| 4,757,606 | 7/1988 | Eaton | 29/748 |
| 4,835,844 | 6/1989 | Gerst et al. | 29/747 |
| 4,837,926 | 6/1989 | Boutcher, Jr. | 29/747 |
| 4,870,747 | 10/1989 | Maack et al. | 29/753 |
| 4,967,470 | 11/1990 | Folk | 29/747 |
| 5,109,602 | 5/1992 | Fukuda et al. | 29/845 |
| 5,157,830 | 10/1992 | Koch | 29/33 M X |
| 5,198,983 | 3/1993 | Blake et al. | 29/721 X |
| 5,208,977 | 5/1993 | Ricard | 29/33 M X |
| 5,333,374 | 8/1994 | Pittau | 29/748 |
| 5,477,607 | 12/1995 | Ohta et al. | 29/748 |

FOREIGN PATENT DOCUMENTS

| | | | |
|---|---|---|---|
| 2 618 953 | 2/1989 | France | 29/747 |
| 0 534 822 | 3/1993 | France | 29/748 |
| 2 681 987 | 12/1993 | France | 29/33 M |
| 3 727 429 | 3/1988 | Germany | 29/748 |

*Primary Examiner*—Peter Vo
*Attorney, Agent, or Firm*—Marshall, O'Toole, Gerstein, Murray & Borun

[57] ABSTRACT

The invention relates to a device and to a machine connecting connection elements into housings of connectors. The device includes; a body (17) which can be moved in the direction of said connector; 4 an insertion tool (18) which is associated, via removable link-age means (22), with said body and is provided with means (23) for gripping said connection element to be introduced; and means (26) for controlling the opening or closure of said gripping means. According to the invention, it comprises elastic means (24) located between said tool and its gripping means, and capable of acting along the longitudinal axis of insertion of said connection element into said housing of the connector, said removable linkage means (22) are defined by an articulation with the center of rotation (22A) which joins up said tool to said body and the center of rotation of which is coincident with said longitudinal axis, and indexing means (25) are associated with said body in order to act on said articulation such as to align said tool (18) with said body.

12 Claims, 8 Drawing Sheets

MACHINE FOR CONNECTING CONNECTION ELEMENTS INTO CONNECTORS

This is a Continuation of U.S. Ser. No. 08/583,271, filed Jan. 5,1996, now abandoned, which was a divisional of U.S. Serial No. 08/327,299 filed Oct. 21, 1994, now U.S. Pat. No. 5,504,990.

BACKGROUND OF THE INVENTION

The present invention relates to a device for connecting connection elements into housings of connectors, and to a machine for automatically connecting said connection elements.

More particularly, the device in accordance with the invention is intended for plugging male or female pins which are mounted beforehand, generally by crimping, on the ends of the conductors of electrical cables, into the corresponding receiving housings of connectors which may be of varied shapes, such as circular, rectangular, or some other shape, and of which the operation of plugging in or inserting the pins is usually carried out via their rear transverse face.

The field of aeronautics constitutes a preferred application of the connecting device and of the automatic machine of the invention. Indeed, the multitude of electrical cables which are intended, via specific connectors, to join up the various apparatus and equipment of the aircraft in order to ensure correct operation thereof, involves numerous operations prior to connecting the pins, which terminate the conductors of said cables, in the corresponding housings of the specific connectors in order thereafter to constitute wiring looms or harnesses. The connectors of each loom, which are equipped with the pins, are then engaged in complementary connectors provided on the equipment or on other looms.

Of course, the connecting device and machine according to the invention could apply to other industrial fields, for example the automobile field, whenever numerous connections between connection elements and connectors are to be made.

There is already known, especially from the Publication of French Patent 2 681 987 of the Applicant Company, such a device for connecting the pins, crimped onto the stripped ends of electrical cables, into the corresponding housings of connectors. This device and the machine which is equipped therewith in particular make it possible to reduce manual intervention, to prevent the risks of errors in the choice between the various pins, the insertion tools available and the connections into the housings of connectors. In order to do this, the device comprises:

- a body which can be moved in the direction of said connector;
- an insertion tool which is associated, via removable linkage means, with said body and is provided with means for gripping said connection element to be introduced into the corresponding housing of the connector; and
- means for controlling the opening or closure of the gripping means, which are associated with said body and respectively allow the connection element to be connected to be mounted in said tool, then said tool to be withdrawn after said element has been connected into the housing of the connector, or said element to be held during its insertion into said housing.

This device described in the abovementioned patent application gives satisfactory and even excellent results, especially compared with the prior manual-insertion tools but, however, again owing to the considerable number of connections to be made (several thousand on a helicopter, for example), difficult or even defective connections may arise which are due essentially to geometric errors between the pin and the housing.

In fact, a first orientation error may arise when the longitudinal axis of the pin, corresponding to that of the tool, is angularly offset with respect to the axis of the housing, so that the pin is introduced into the housing slightly askew, with the risk of it coming into abutment in an internal shoulder of this housing, or of deforming too much. A second positioning error may equally result from the fact that the axis of the pin is then offset parallel to the axis of said housing, so that its end abuts against the entrance edge of the housing, preventing the connection, or, in the best of cases, as a result of the insertion force, ends up becoming deformed in order to engage into the housing.

It is furthermore appropriate to mention, owing to the fact that connection takes place without guidance (especially absence of a chamfer in the entrance edge of the housings), the risks of the pin becoming immobilized at various points, for example at the internal shoulder which is provided in the housing and against which the collar of the pin usually is applied after it has got through an elastic sleeve allowing it to be held axially in the connected position. Such risks of immobilization, corresponding to hard spots encountered during the introduction of the pin, quite often lead to insertion failure.

SUMMARY OF THE INVENTION

The object of the present invention is to over-come these drawbacks and it relates to a connecting device and machine making it possible to take account of these possible risks of error.

For this purpose, the connecting device of the type described hereinabove is noteworthy, according to the invention, in that it comprises elastic means located between said tool and its gripping means, in order to be capable of acting along the longitudinal axis of insertion of said connection element into said housing of the connector, in that said removable linkage means are defined by an articulation with the center of rotation which couples said tool to said body and the center of rotation of which is substantially coincident with said longitudinal axis of the connection element, and in that indexing means are associated with said body in order to act on said articulation such as to align said tool with said body, parallel to said housing.

Thus, by virtue of the invention, the insertion of the pins into the respective housings of the connectors takes place without difficulty for all of the connections to be made, even when geometric errors may arise, for some connections, initially before the pin is introduced. Indeed, by means of the articulation with the center of rotation and with the associated indexing means, the insertion tool, and, therefore, the pin gripped by the gripping means, are automatically repositioned at least parallel to the axis of said housing. Thus, even when, after this repositioning, the tool is slightly offset parallel to the axis of the housing, the pin can nevertheless "self-center" in said housing, by virtue of the freedom of movement given by the articulation with center of rotation, said indexing means being moved aside. Moreover, even when hard spots are encountered by the pin as it is being inserted into the housing, the elastic means allow them to be detected in order to move the device back and then to reintroduce it in a different way, in order to insert the pin without deforming it.

As a consequence, by virtue of the axial elastic means and of the articulation with the center of rotation, the link between the insertion tool and the body of the device is flexible and no longer rigid as it was before, so that the pins engage and are inserted suitably into the housings in the connectors, guaranteeing connections which are reliable in service.

Advantageously, the device additionally comprises means for detecting and analyzing the forces during insertion of said pins into the respective housings of said connectors, said means being associated with said movable body. Thus, it is possible to permanently monitor the force of insertion of the pin into the housing and to detect any anomaly during insertion, such as a hard spot, by means of the axial elastic means.

Preferably, said body is hollow and the insertion tool is housed and held inside it by said removable linkage means with articulation, said means for gripping said tool projecting with respect to said body. The device is then appreciably compact.

In a preferred embodiment, said articulation with the center of rotation is spherical and comprises a ball joint linked coaxially to said tool, opposite its gripping means, and mounted in a corresponding ring which is fixed to said body. Thus the simplicity of production and the reliability of operation of the linkage means may be noted. For example, said indexing means may be defined by a jack or the like, carried coaxially by said body and capable of acting on the ball joint of said articulation in order to align said tool, capable of holding a pin by its gripping means, coaxially with said tool.

In this case, the link between said jack and said ball joint may be formed by means of a conical recess which is formed in the ball joint and with which the end, of complementary shape, of the rod of said jack may interact.

In a preferred embodiment, said elastic means comprise springs which are associated with said tool, in the vicinity of its transverse end face pointing toward said gripping means, and with which the latter interact in order to be capable of sliding axially between two extreme positions corresponding to the travel of said springs. Thus, by this simple embodiment, the springs, when they are compressed following an anomaly during insertion, make it possible to store up energy which they restore to the pin if the latter manages to free itself, by means of the gripping means, in order to force the pin, flexibly, to continue its progress into the housing of the connector. In the opposite case, if the force reaches a predetermined threshold, the device is withdrawn in order to carry out the necessary checks.

For example, said gripping means are defined by two jaws capable of relative angular movement with respect to each other under the action of said control means.

In this case, said springs are located in housings of said tool, emerging from its transverse end face, and said jaws are equipped with rods engaging respectively into said housings, passing axially through said springs, and including external shoulders against which one of the ends of said springs comes to bear, while their other end is applied against a limit stop of said housings.

Furthermore, one of said jaws is mounted on a pivoting arm of said tool, with which said corresponding springs are associated. The control means of said gripping means are defined by a jack or the like linked to said movable body and capable of acting therefore on said pivoting arm of said tool in order to open at least said moving jaw of said gripping means. The moving jaw returns to the closed position, for example through an elastic return of the pivoting arm, in order to be applied against the other jaw, possibly while holding a pin.

Advantageously, said insertion tool is provided with a longitudinal slit which emerges from its transverse face, toward said gripping means, and in which the end of said cable to be connected may be accommodated so as to guide it as far as said gripping means gripping the pin. In addition, a jack or the like is provided on said movable body in order, when it is actuated, to pass radially through the longitudinal slit of said tool and to hold the end of said cable in said slit during the insertion of the pin.

Moreover, a jack or the like which is capable of immobilizing said cable in said insertion tool, in order to carry out a test of retention of said cable in order to check the locking of the pin in the housing of the connector, may be associated with said body.

The invention also relates to a machine for automatically connecting connection elements, such as pins equipping the ends of electrical cables, into housings of connectors, of the type including:

- a supporting structure on which said connectors may be accommodated;
- moving equipment linked to said supporting structure and capable of moving along the three axes of an orthonormal reference frame;
- at least one connecting device which comprises a body carried by said moving equipment, and an insertion tool which is associated, removably, with said body;
- an area for changing said tools, which are chosen as a function of the geometric characteristics of said elements to be connected; and
- a programmable control unit, containing data relating to the various connections to be made as a function of the connection elements and of the housings of the connectors, and capable of controlling said moving equipment and said connecting device.

Advantageously, the latter is of the type specified above.

Said means for detecting and analyzing forces which are associated with said connecting device are then joined up to said programmable control unit and are defined by a strain gauge attached to the body of said device.

According to another feature, the machine additionally comprises viewing means which are mounted on said moving equipment in order to identify the connectors to be connected and to determine the coordinates of the various receiving housings, and which are defined by at least one camera linked to said programmable control unit.

More particularly, said moving equipment may be composed:

- of a head mounted so that it can slide along the axis OZ of said reference frame, parallel to said housings of said connectors, and carrying, in its extension, said connecting device;
- of a slide on which said head is located and which is mounted so that it can slide along the axis OY of said reference frame; and
- of a beam on which said slide can move and which is mounted so that it can slide along the axis OX of said reference frame on two guide rails which are fixed to said supporting structure.

Thus, this moving equipment acts as a three-axes robot, the movements of which are controlled from the control unit.

Furthermore, it is provided with a mechanism for moving apart the cables which have already been connected and guiding the cable to be connected into the corresponding housing of the chosen connector, said mechanism being mounted, so that it can slide, on said moving equipment and exhibiting a member in the form of a funnel which is substantially coaxial with said connecting device and which is capable of having the pin carried by the gripping means passed through it.

Preferably, the machine comprises an area for prearranging of the cables after connection, which area is situated on said supporting structure and which comprises a plurality of elastic clips capable of receiving said cables via gripping mechanisms which are associated respectively with said clips. Thus, the cables are directed along the routing of the loom to be obtained, as they are connected.

The figures of the appended drawing will make it easy to understand how the invention may be achieved. In these figures, identical references denote similar elements.

DETAILED DESCRIPTION OF THE PREFERRED EMBODIMENTS

Figure 1:
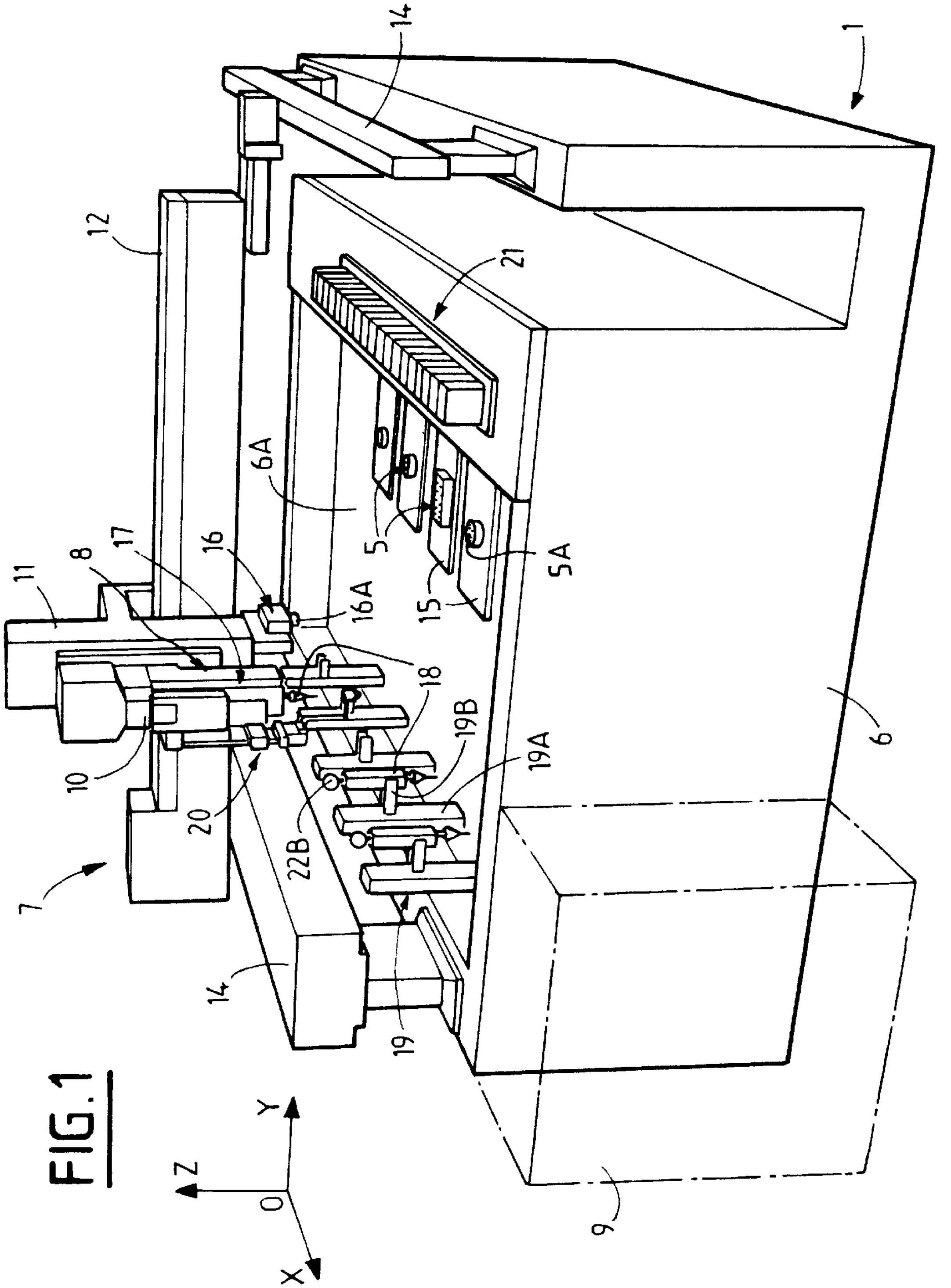
FIG. 1 shows, in diagrammatic perspective, an automatic connecting machine equipped with a connecting device in accordance with the invention.

The object of the connecting machine 1, shown in FIG. 1, is the automatic fitting of connection elements, such as pins provided at the ends of electrical cables, into housings of electric connectors. The pins 2 of the electrical cables 3 and the housings 4 of the connectors 5 are more particularly represented with regard to FIGS. 8A and 8B.

In this embodiment, the machine 1 especially comprises a supporting structure 6, moving equipment 7, a connecting device 8 and a programmable control unit incorporated into a control desk 9 symbolized in chain line in FIG. 1 and grouping together the computer hardware (screens, printer, microcomputers) required for the operation of the machine. More particularly, the moving equipment 7 is mounted on the supporting structure 6 and carries the connecting device 8. This equipment is capable of moving along the three axes OX, OY and OZ of an orthonormal reference frame connected to the supporting structure of the machine. In order to do this, it is composed of a head 10 which is mounted so that it can slide, with respect to a slide 11, along the axis OZ which, in this example, corresponds to the vertical, and at the end of which the connecting device 8 is situated. For its part, the slide 11 is mounted so that it can slide, along the axis OY of the reference frame, on a beam 12 which is therefore horizontal and the ends of which are carried by two parallel and opposite guide rails 14, along the axis OX of said reference frame. These rails 14 are fixed to the supporting structure of the machine. Thus, the beam 12, the slide 11 and the head 10 form the moving equipment 7, which thus corresponds to a three-axes robot.

Supports 15 are arranged on the bed 6A of the supporting structure 6, in order to accommodate and fasten the connectors 5 to be connected, the dimensions and shapes of which are varied and the layout of which on the supports is such that the accommodating housings 4 are parallel to the axis OZ of said reference frame, that is to say parallel to the connecting device carried by the head 10 of said moving equipment 7. The rear transverse faces 5A of the connectors, via which the insertions take place, obviously point outward, in the plane XOY. Moreover, as this FIG. 1 shows, viewing means 16 are provided on the slide 11 of the equipment. They consist of a video camera 16A which makes it possible to identify especially the various connectors to be connected and to determine, by OX and OY movements, the exact coordinates of the housings provided in each connector. Quite clearly, the various data on these connectors and housings are acquired and incorporated into said control unit, which makes it possible to build up a database relating to the connectors which is constantly updated for each new connector, different from those already stored in memory.

Figure 2:
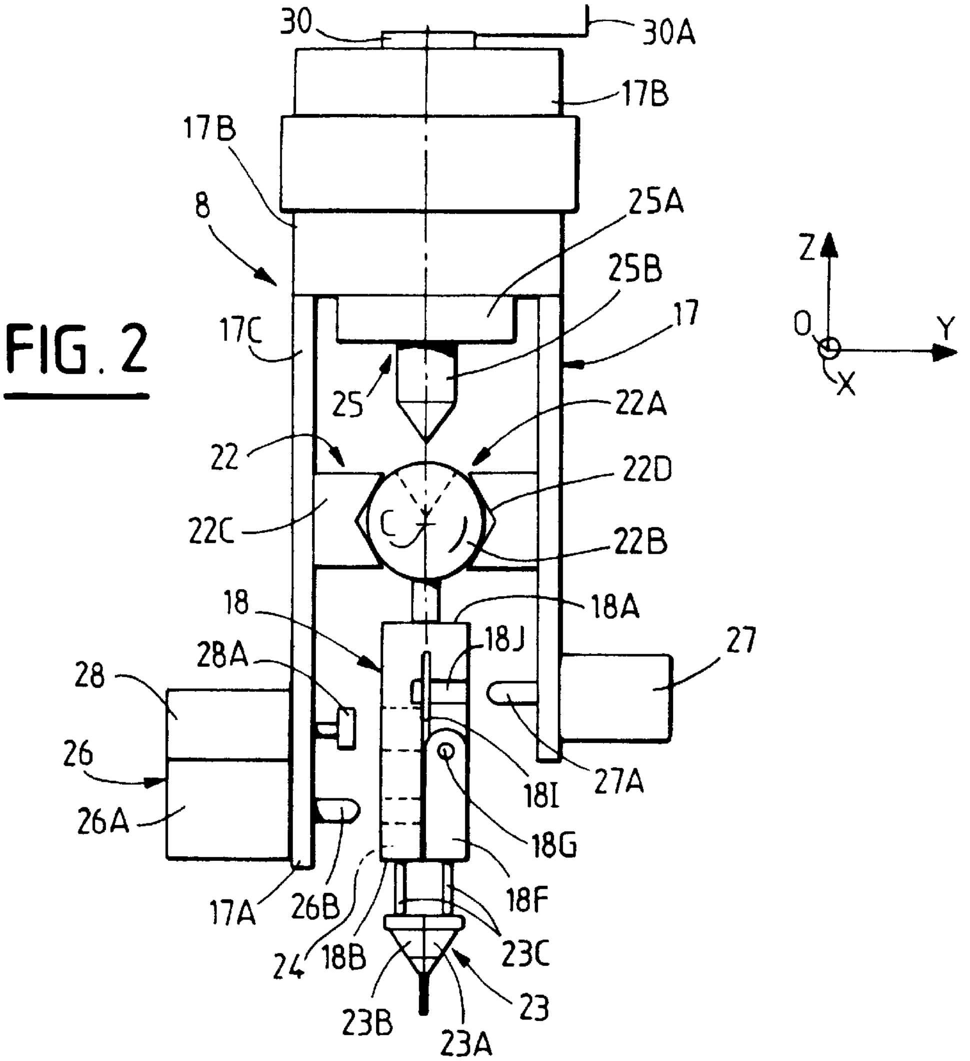
FIG. 2 represents a connecting device as it is arranged on the machine.

The connecting device 8 comprises, as FIG. 2 shows, a body 17 which is fixed, by any appropriate means, to the head 10 of the moving equipment, and an insertion tool 18 which is attached, removably, to the body 17 and is intended to fit pins 2 into the housings 4 of the connectors. Owing to the numerous dimensional and shape characteristics of said pins, a plurality of insertion tools 18, which are designed for each type of pin, must also be provided. As a consequence, the machine 1 comprises an area 19 equipped with the various insertion tools required. Represented in FIG. 1, by way of example, are two insertion tools 18 held respectively by brackets 19A by means of appropriate holding elements 19B, while an insertion tool 18 is already mounted in the body of the connecting device 8 situated at the end of the head 10 of said moving equipment 7.

Furthermore, the machine 1 is equipped with a mechanism 20 for facilitating the fitting of the pins into the housings of the connectors and with an area 21 for prearranging of the connected cables. This mechanism 20 and this area 21 will be described more particularly during the description of the operation of the machine.

The body 17 of the device shown in FIG. 2 is hollow and, for example, has a polygonal cross section, such as a square, although any other shape of cross section is structurally possible. The insertion tool 18 has a parallelepipedal general shape and it is mounted inside the hollow body 17, being associated therewith by removable linkage means 22. It is, moreover, equipped with controllable gripping means 23 making it possible to grip the pin of the cable to be connected. With respect to the orthonormal reference frame of the machine, the hollow body 17 is aligned with the axis OZ, along which the head 10 of the equipment 7 can slide and with which said housings 4 of the connectors are also aligned, in parallel. The gripping means 23 project with respect to the open end 17A of the body, and the removable linkage means 22, located on the side of the transverse face 18A opposite that 18B of the tool extended by the gripping means,point toward the end face 17B of the body, which closes off the other end of the body.

The connecting device 8 comprises, according to the invention, elastic means 24 located between the tool 18 and its gripping means 23, the object of which is to act along the longitudinal axis of insertion of the pin into the housing of the connector, and the removable linkage means 22 are advantageously defined by an articulation 22A with the center of rotation C which couples the tool 18 to the body 17 and the center C of which is coincident with the longitudinal axis of insertion, as will be seen later. Indexing means 25 are then associated with the body 17 in order to act on the articulation 22A such as to allow said insertion tool to be aligned with the axis of the body 17, that is to say along OZ. More particularly, the articulation 22A is spherical, so that it is composed of a ball joint 22B situated in the axial extension of the tool 18 and coming out of its transverse face 18A, and of a ring 22C fixed to the lateral wall 17C of the body and having a V-shaped internal annular surface 22D receiving said ball joint. The center of the latter defines the center of rotation C of the articulation. The ring 22C may be produced from an elastically-deformable material so as, when the tool has to be changed, to allow the ball joint to be disengaged from the body 17 integral with the head 10 of the moving equipment. For example, the tool-change operation may take place automatically. In this case, the tool engages in the holding elements 19B of the corresponding bracket 19, then the body 17 of the device is moved by the moving equipment 7 in order to release the ball joint 22B from the ring 22C and to leave said insertion tool on its bracket. At this moment, the moving equipment is brought to face another tool to be used, such that the ring 22C of the body 17 engages the selected tool by interaction of its ball joint with the ring, and disengages said tool from the linkage elements 19B by a suitable movement of the moving equipment 7.

Quite clearly, the tool-change operation may equally well take place manually.

Figure 4A:
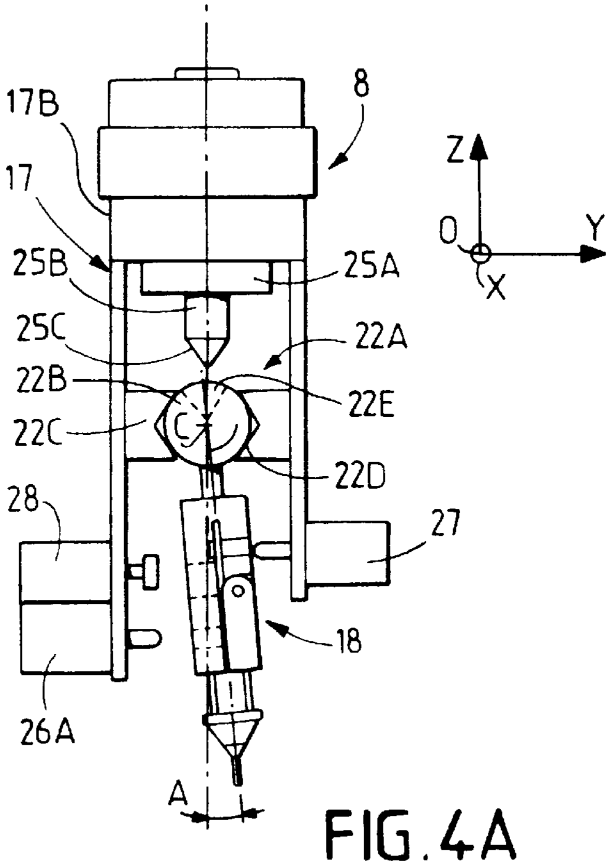
FIGS. 4A and 4B show the alignment of the tool with respect to said body, by virtue of the removable linkage means.
Figure 4B:
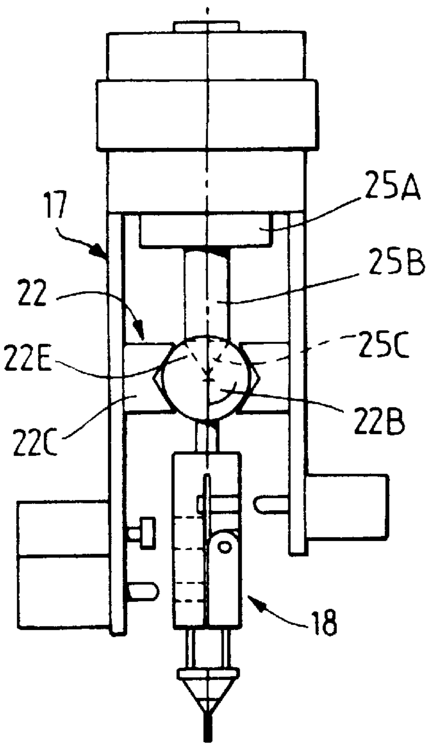

This articulation with a ball joint joining the tool to the body of the connecting device also makes it possible, before each connection, to align the insertion tool 18 along the longitudinal axis of the body 17, that is to say along the axis OZ. In order to do this, there has been represented, in FIG. 4A, the case in which the tool is angularly offset by an angle A with respect to the longitudinal axis of the body of the device, corresponding to the axis OZ. In order to prevent this previously mentioned angular offset error, indexing means 25 are provided and they are made up of a jack 25A coupled to the end face 17B of the body and located along the longitudinal axis. Thus, when the jack is actuated, controlled from said desk before each connection to be carried out, the conical end 25C of its rod 25B engages in a similar recess 22E formed in the spherical ball joint 22B, so as to automatically reposition the insertion tool 18 along said axis, as FIG. 4B shows. Thus, through the combination of the removable linkage means 22 with spherical articulation and the indexing means 25, the tool of the device is perfectly aligned with respect to the longitudinal axis of insertion. Before each connection, the rod 25B of the jack is retracted so that the aligned tool advantageously has degrees of freedom about the center C which are necessary for the progression of the pin into the housing of the connector.

Figure 5A:
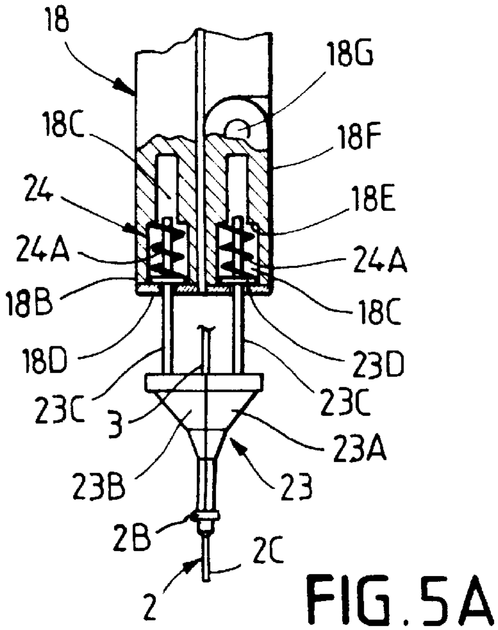
FIGS. 5A and 5B illustrate the two extreme positions which the gripping means can occupy, by virtue of the axial elastic means.
Figure 5B:
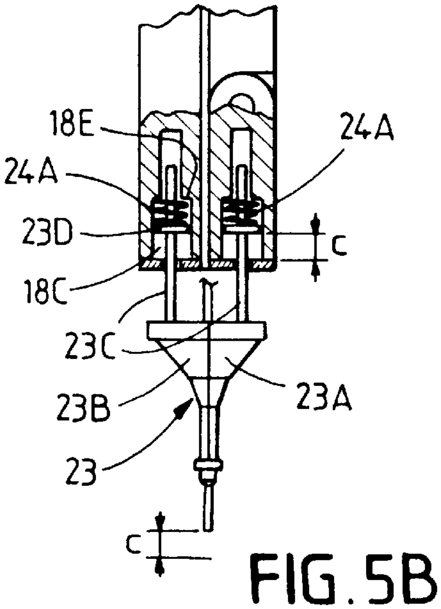

Moreover, the axial elastic means 24 of the device make it possible advantageously to participate in the insertion of the pins into the housings, particularly when they encounter hard spots, as mentioned beforehand. In this embodiment illustrated in FIG. 5A, the elastic means 24 are defined by compression springs 24A which are accommodated in housings 18C provided in the insertion tool 18 and emerging from its transverse face 18B toward the gripping means 23, interacting with these. Indeed, the gripping means are defined by two jaws 23A, 23B capable of relative angular movement with respect to each other in order to grip the pin to be inserted and they emerge from parallel rods 23C, for example two per jaw, which then engage in the respective housings 18C of the tool. Each rod, which is surrounded by the spring 24A, is equipped with an external shoulder 23D which is pressed elastically by the spring against a plate 18D, terminating the transverse face 18B of the tool and through which the corresponding rods pass. The springs 24A are initially in a relaxed position bearing, on the one hand, on the external shoulders of the rods and, on the other hand, on internal limit stops 18E provided in the housings, so that the gripping means 23, and therefore the pin 2, may slide coaxially over a travel C, as FIG. 5B shows, between the relaxed position and the compressed position of the springs 24A. Thus, in the case in which the pin encounters a hard spot during its insertion, these springs compress and store up energy which they can restore if the pin manages to free itself, thus allowing it to be inserted gently and elimination of the jerky insertion forces which often arise. If the pin remains immobilized, the sp-rings compress as far as a maximum force threshold, which halts the progression of the device, as will be seen later.

Figure 6A:
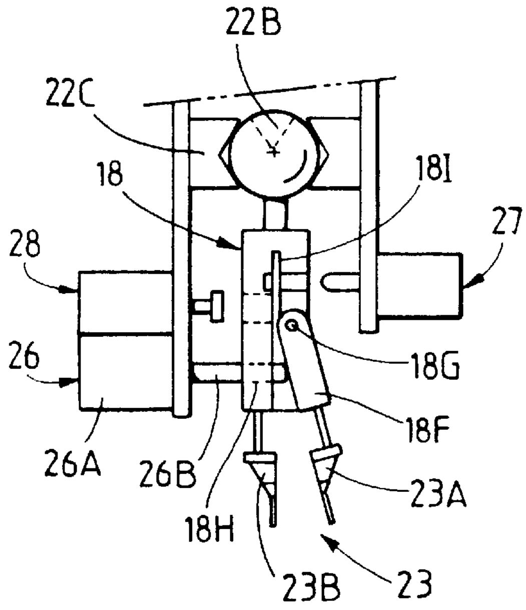
FIGS. 6A and 6B illustrate the operation of the gripping means under the action of the control means.
Figure 6B:
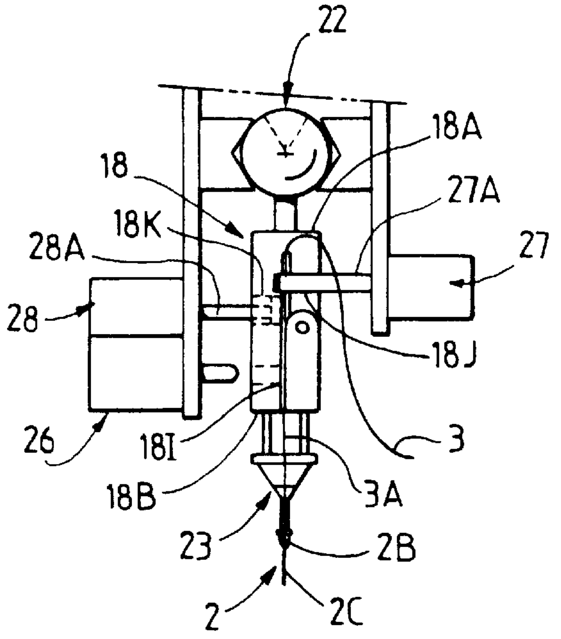

As regards the gripping means 23, one of the jaws, for example the jaw 23A, is mounted on a pivoting arm 18F incorporated into the tool and therefore carrying the corresponding two springs 24A which surround the rods 23C of said jaw. The arm 18F is mounted on a spindle 18G orthogonal to the longitudinal axis of the device and it can move angularly about this spindle under the action of control means 26, such as to open or to close the moving jaw 23A with respect to the jaw 23B, as FIGS. 6A and 6B show. The control means 26 are defined by a jack 26A which is fixed perpendicularly to the lateral wall 17C of the body and the rod 26B of which, passing through a radial passage 18H of said tool, can act on the arm 18F in order to cause it to pivot about the spindle 18G and in this case to open the gripping means. As the jaws 23A and 23B are moved away from each other, the end 3A of a cable 3 to be connected may then be located in said tool 18 and, more particularly, in a median longitudinal slit 181 formed in the tool and emerging from the transverse face 18B. Thus, the end of the cable is guided such as to offer up the pin 2 in the axis of the gripping means. At this moment, as FIG. 6B shows, the rod 26B of the jack 26 is retracted and the moving jaw 23A is brought back to its initial position, for example by means of a return spring which is not represented provided in the articulation spindle 18G of the arm 18F, so that the two jaws grip the pin 2. In order to hold the end of the cable in the longitudinal slit 18I of said tool, a jack 27 is fixed radially to the lateral wall 17C of the body, such that its rod 27A, when actuated, passes through a radial passage 18J of the tool in order to engage in the slit and to prevent the end 3A of the cable from leaving the slit.

Furthermore, it is noted that, in addition to the jacks 26A and 27, another jack 28 is fixed radially to the lateral wall 17C of the body 17. The object of this jack 28 is to immobilize the end of the cable in the tool in order, after insertion of the pin into the housing of the connector, to carry out a retention test and to check whether the pin-housing connection is correct. In order to do this, as FIG. 6B shows, the rod 28A of the jack passes through a radial passage 18K of the tool in order to emerge in the longitudinal slit 18I and to immobilize the cable in the latter.

Figure 3A:
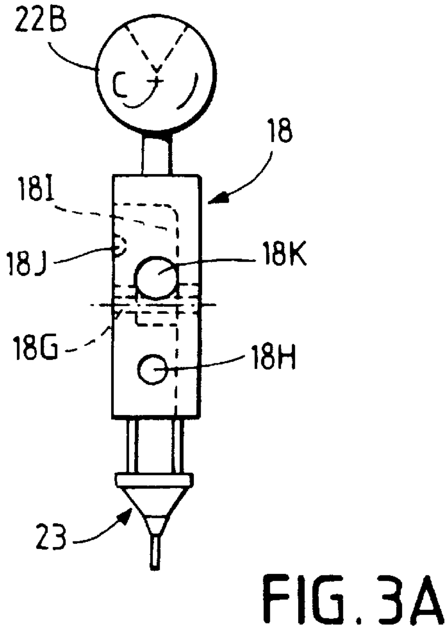
FIGS. 3A and 3B are respectively opposite lateral views of the insertion tool of said device.
Figure 3B:
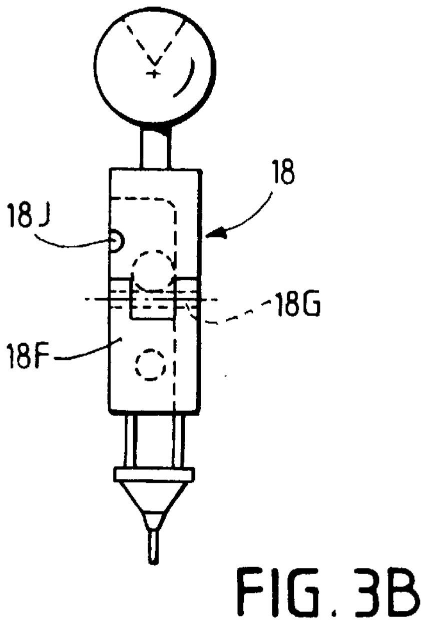

FIGS. 3A and 3B especially make it possible to demonstrate the profile of the slit 181, the various radial passages 18H, 18J and 18K, and the articulation spindle 18G of the pivoting arm 18F of said tool 18.

The operation of the automatic connecting machine 1, equipped with the connecting device 8 in accordance with the invention, unfolds as follows.

Figure 7E:
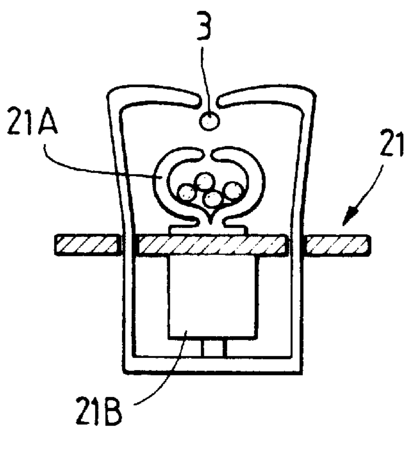
FIGS. 7A, 7B, 7C, 7D, 7E and 7F diagrammatically show the main phases of operation of said machine in order to proceed with the insertion of a pin into the housing of the connector.
Figure 7F:
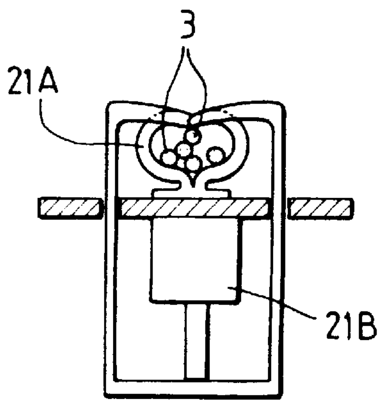
Figure 7A:
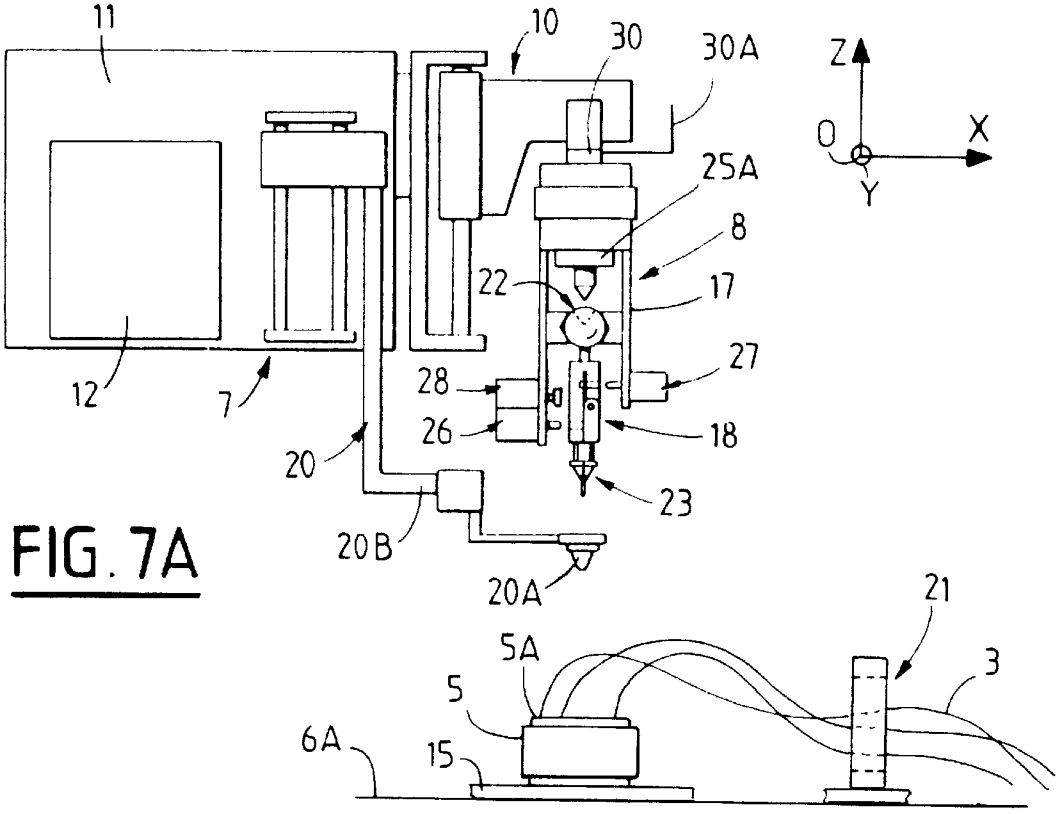

First of all, it will be assumed that, as FIG. 7A shows, cables 3 are already connected into the housings of a connector 5 fixed to its support 15 linked to the bed 6A of the supporting structure. These cables 3 are directed toward the prearranging zone 21 which consists in routing the cables according to the configuration of the loom to be produced in order thus to give a preform to said final configuration. These cables are then offered up above elastic clips 21A and introduced into the latter by a mechanism with a jack 21B which engages the cable inside the clip, as FIGS. 7E and 7F show. Moreover, in FIG. 7A, the mechanism 20 facilitating the insertion of the pins to be fitted and protecting the already-connected cables, which hinder the passage of the insertion tool toward the connector, will be noted. In one embodiment, the mechanism 20 comprises a flared member 20A in the shape of a funnel, which is located substantially coaxially with the device 8 in order to have the pin held by the gripping means 23 of the insertion tool 18 passed through it. The flared shape of the member 20A thus contributes to gently moving apart the already connected cables 3 and additionally to giving an ideal passage to the pin 2 of the cable to be connected. This member 20A is provided at the end of a bent arm 20B capable of sliding, along the axis OZ of. the reference frame, with respect to the slide 11 of said moving equipment 7.

Advantageously, means 30 for detecting and analyzing the forces during the insertion of the pins into the respective housings of the connectors are is arranged between the end face 17B of the body and the head 10 of the moving equipment and they are defined by a strain gauge joined up, by a link 30A, to the programmable control unit of said desk 9 of the machine.

Before commencing an operating cycle, the characteristics of the pin of the new cable to be connected are checked. if this pin requires the use of an insertion tool 18, especially its gripping means, which is different from the preceding one, then this tool is changed in the way indicated previously. If not, the tool 18 is held in the body 17 of the device by the linkage 22. The head 10 of the moving equipment is then in the up position and the operator can then fit the pin 2 into the insertion tool 18. In order to do this, the jack 26A is actuated so that its rod 26B causes the arm 18F of the tool to pivot and angularly moves the moving jaw 23A, opening the gripping means 23. The operator then places the pin against the fixed jaw 23B, taking care to guide the end 3A of the cable into the longitudinal slit 181 of the tool and controls the jack in order to retract the rod 26B, which leads to closure of the moving jaw 23A.

Figure 8A:
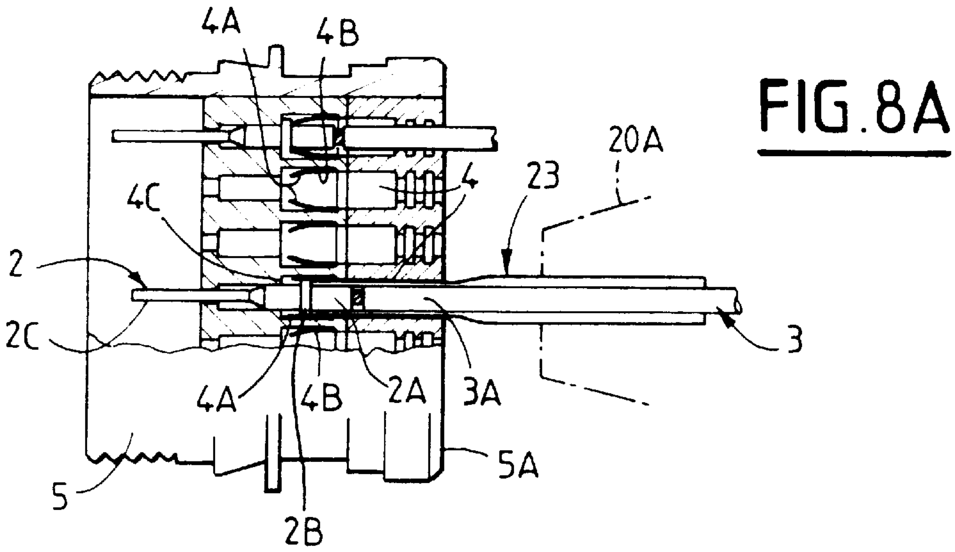
FIGS. 8A and 8B more particularly, and on a larger scale, show the insertion of pins, respectively male and female ones, by means of the device, into corresponding housings of connectors.

As is seen especially in FIG. 8A, the jaws grip the rear part 2A of the pin 2, behind its collar 2B, so as best to offer up its active part 2C for connection.

Then, the moving equipment 7 is moved in order to bring the connecting device 8 to the coordinates of the corresponding housing 4 of the connector and the insertion tool 18 is then automatically angularly realigned with respect to the longitudinal axis of the body 17 aligned along OZ, through the action of the indexing jack 25A which acts on the ball joint 22B of the articulation 22A. As FIG. 7A shows, the tool 18 is then suitably aligned. In the meantime, the rod 27A of the jack 27 is actuated in order to hold the end 3A of the cable in the longitudinal slit 18I of the tool 18.

Figure 7B:
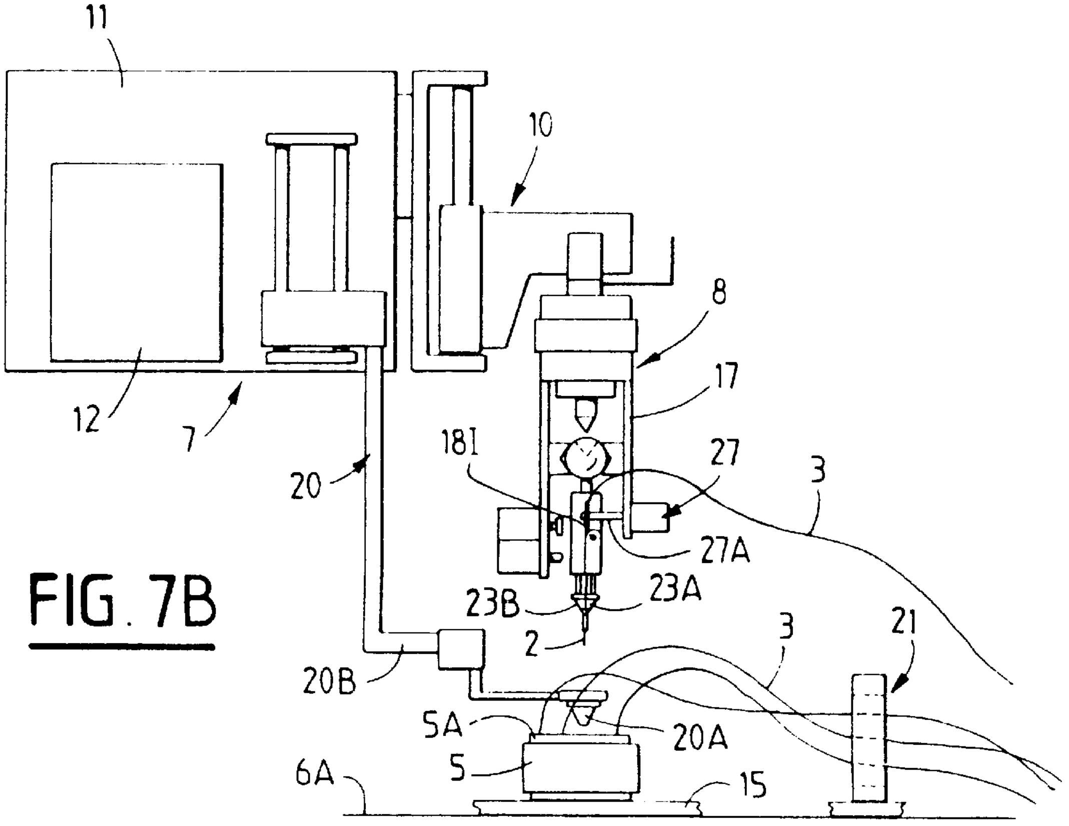

At that moment, the insertion phase proper may commence. In order to do this, the mechanism 20 is controlled to bring the flared member 20A into the axis of the chosen housing, in proximity to the rear transverse face 5A of the connector, making it possible to clear the already connected cables, as FIG. 7B shows. Then, after a rapid travel of the head 10 bringing the pin 2 into the vicinity of the flared member 20A along the axis OZ, insertion takes place with a slow travel of the head carrying the connecting device 8. During all this insertion travel, the reactive forces on the tool are analyzed, in real time, by means of the strain gauge 30 joined up to the control unit, in order to detect the locking of the pin in its housing or to detect any anomaly, as will be seen later with regard to FIGS. 10 and 11.

Figure 7C:
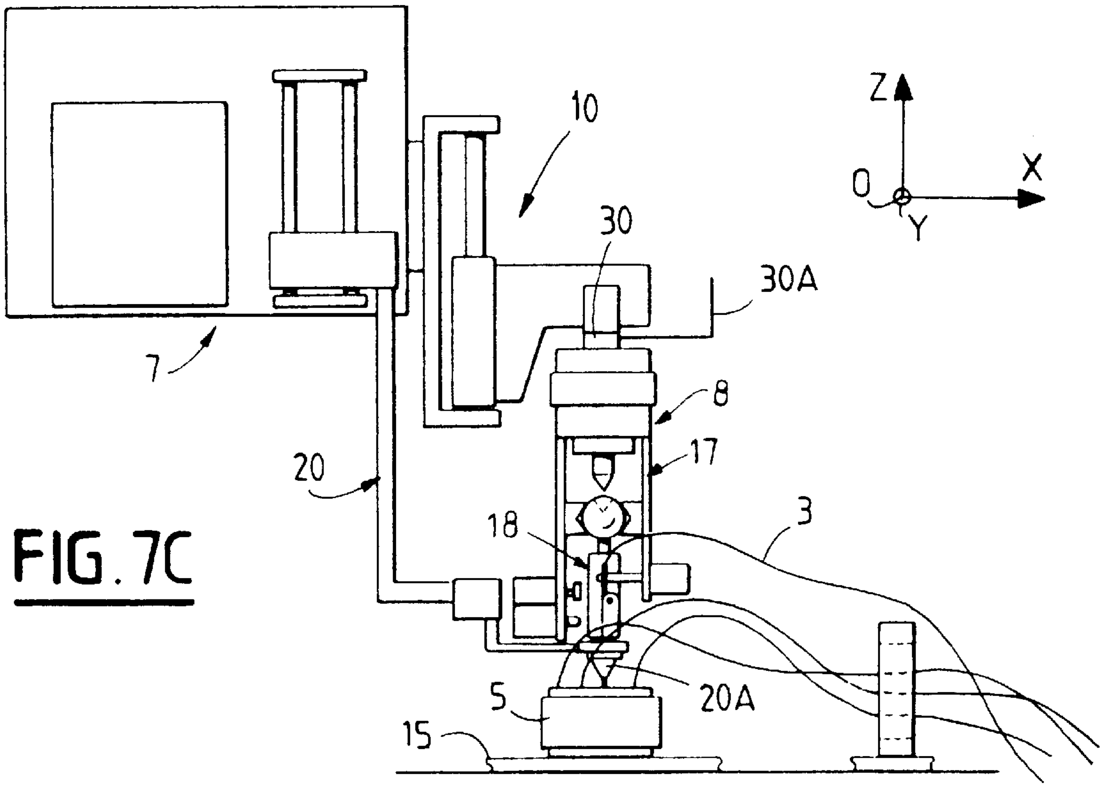
Figure 7D:
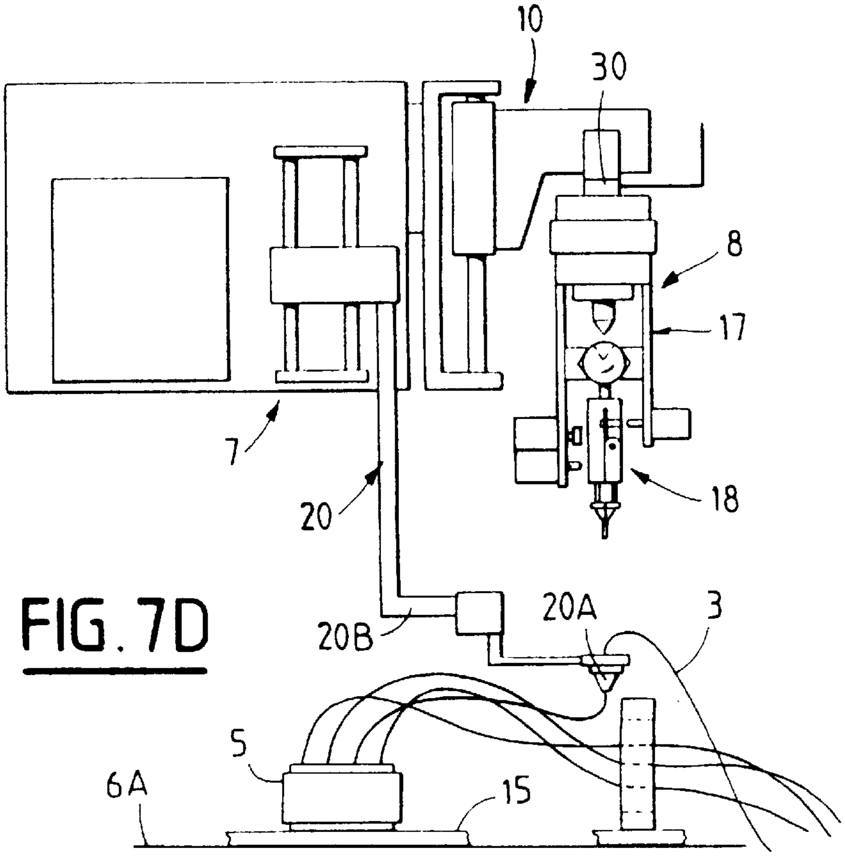
Figure 8B:
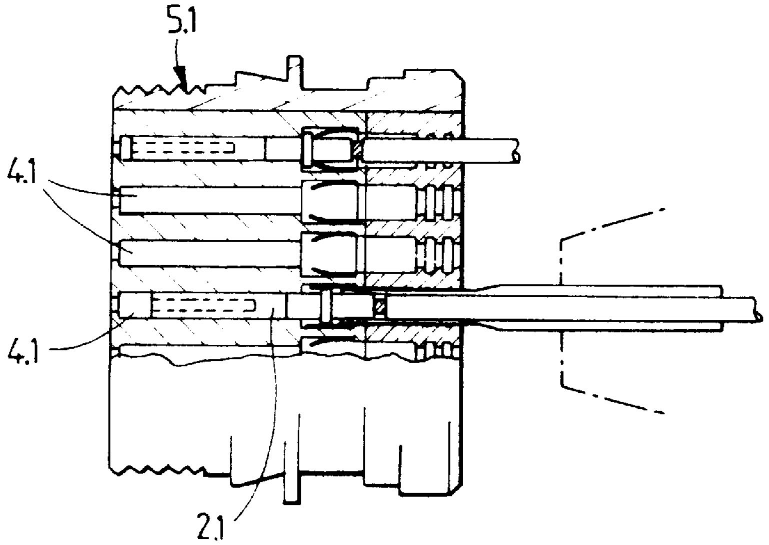

To return to the insertion phase represented in FIG. 7C and in detail in FIG. 8A, the collar 2B of the male pin 2 is seen to get through and move apart, in the usual way, the elastic tabs 4A of a sleeve 4B situated in the housing 4. The connection is definitively established when the collar 2B of the pin has got through the tabs 4A in order to come into abutment against a shoulder 4C of said housing, said tabs then returning spontaneously to their position in order to be applied back of the collar and therefore to immobilize it axially in position against the shoulder 4C, guaranteeing the connection. FIG. 8B shows the insertion of a female pin 2.1 into the housing 4.1 of another connector 5.1.

When the connection has been established, a retention test is carried out. In order to do this, the rod 28A of the jack 28 is actuated in order to immobilize the end 3A of the cable in the longitudinal slit 181 of the tool 18. Then the tool is axially moved back slightly via the body 17 of the device and the head 10 of the moving equipment. If the test proves conclusive, that is to say if the pin remains locked, the tool 18 is disengaged by returning the head 10 of said moving equipment to the up position, the jaws of said gripping means gliding over the rear part 2A of the pin; if inconclusive, the operator is warned through a signal appearing on the control desk so that he can intervene. When the head 10 is in the up position, the rod 27A of the jack 27 is retracted and the moving jaw 23A is opened in order to release the cable 3 from the longitudinal slit 181 of said tool and, by means of the flared member 20A of the mechanism, through which the cable passes, the latter is brought toward the prearranging area in order to be introduced into the chosen elastic clip 21A, via the jack 21B.

Figure 9:
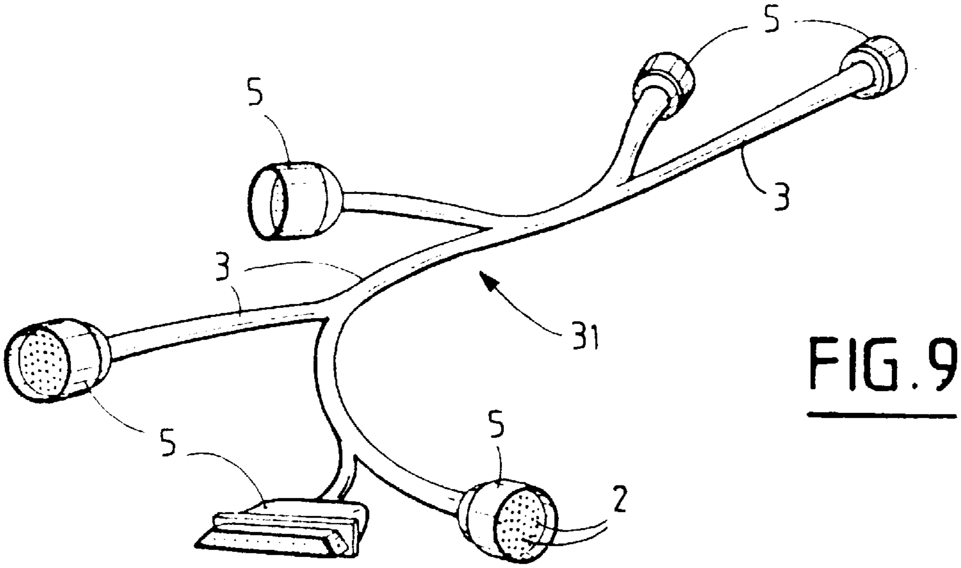
FIG. 9 represents a wiring loom or harness obtained.

Now that the connecting cycle is over as regards the first end of this cable 3, the moving equipment 7, if necessary, changes tool and then the operator puts the pin of the second end of the cable in place and starts a new cycle. When all the cables have been processed, their pins having been inserted into the connectors, a wiring loom or harness 31 is obtained after prearranging and definitive routing of the cables in the desired arrangement, which is ready to connect together the various equipment or connectors of other looms, like the one illustrated by way of example in FIG. 9.

Figure 10:
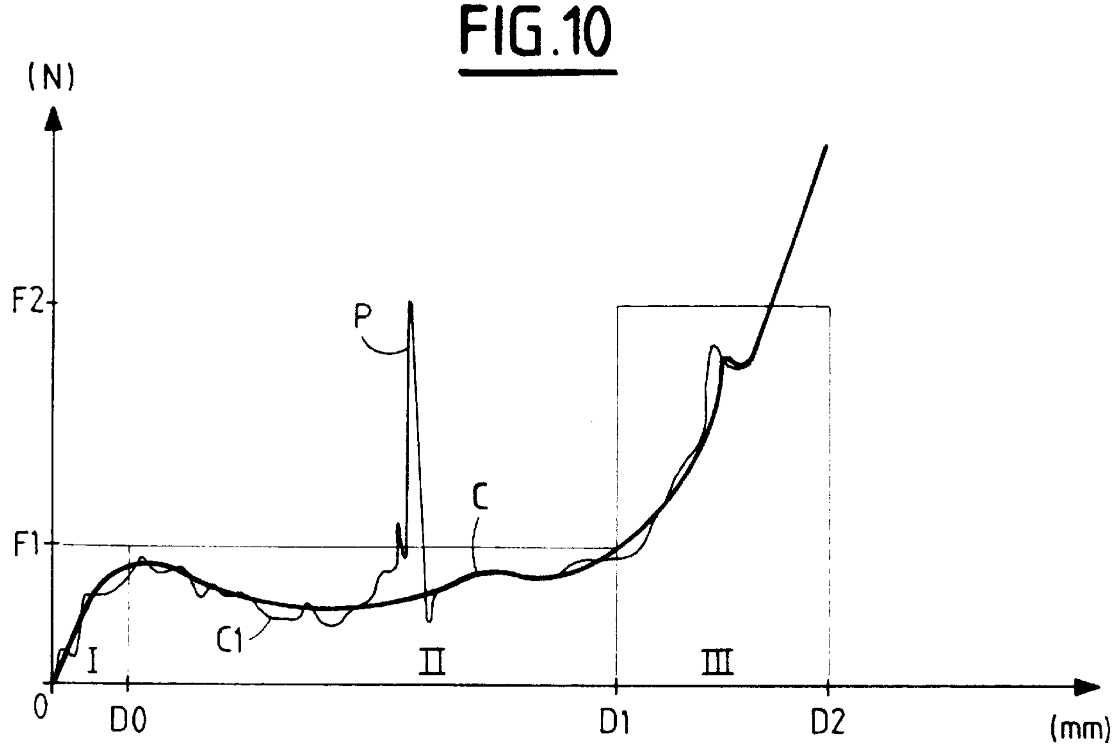
FIG. 10 is a diagram representing the force to be exerted during insertion of a pin into the housing and illustrates the two curves obtained respectively with a conventional device and with the device according to the invention.

The diagram represented in FIG. 10 shows the force exerted, expressed in newtons, as a function of the movement, expressed in millimeters, when inserting a pin into the housing of the connector, until it locks. The curve C, in heavy line, corresponds to the one obtained by the connecting device 8 of the invention mounted on the machine 1, while the curve C1 corresponds to the one obtained by a prior connecting device. It is noted that the curve Cl has a jerky profile essentially resulting from the fact that the linkage between the insertion tool and the body of the device is rigid. Insertion then continuously takes place in jerks owing to the various positioning errors and hard spots encountered. One of the latter, P, has been represented by way of example on this curve C1. In contrast, the connecting device of the invention, by virtue of a flexible coupling (axial elastic means 24 and articulation with ball joint 22A) between the tool 18 and the body 17 of the device, makes it possible to "smooth" the curve in order to obtain the curve C in which it is noted that the force varies evenly, without abrupt change, during the insertion of the pin.

Indeed, according to the invention, success has been achieved in reproducing an insertion done manually by an operator who changes the forces he is transmitting to the tool as well as its orientation as a function of what he senses.

Moreover, the curves obtained may be broken down into three areas in order to interpret them. A first area I, delimited by the points O, DO and F1, corresponds to the start of insertion and makes it possible to detect an anomaly arising from the positioning of the pin with respect to the housing, and especially a parallel offset of this pin. A second area II, delimited by the points DO, D1 and F1, corresponds to the insertion of the pin into the housing and makes it possible to detect possible immobilization of this pin during its progression, due to a hard spot represented, for example, on the curve C1 of FIG. 10 and requiring a high force in order to overcome it, which may give rise to damage to the pin. Finally, a third area III, delimited by the points D1, D2 and F2, corresponds to the locking of the pin in the housing by the elastic sleeve and makes it possible to detect the end of insertion.

Figure 11:
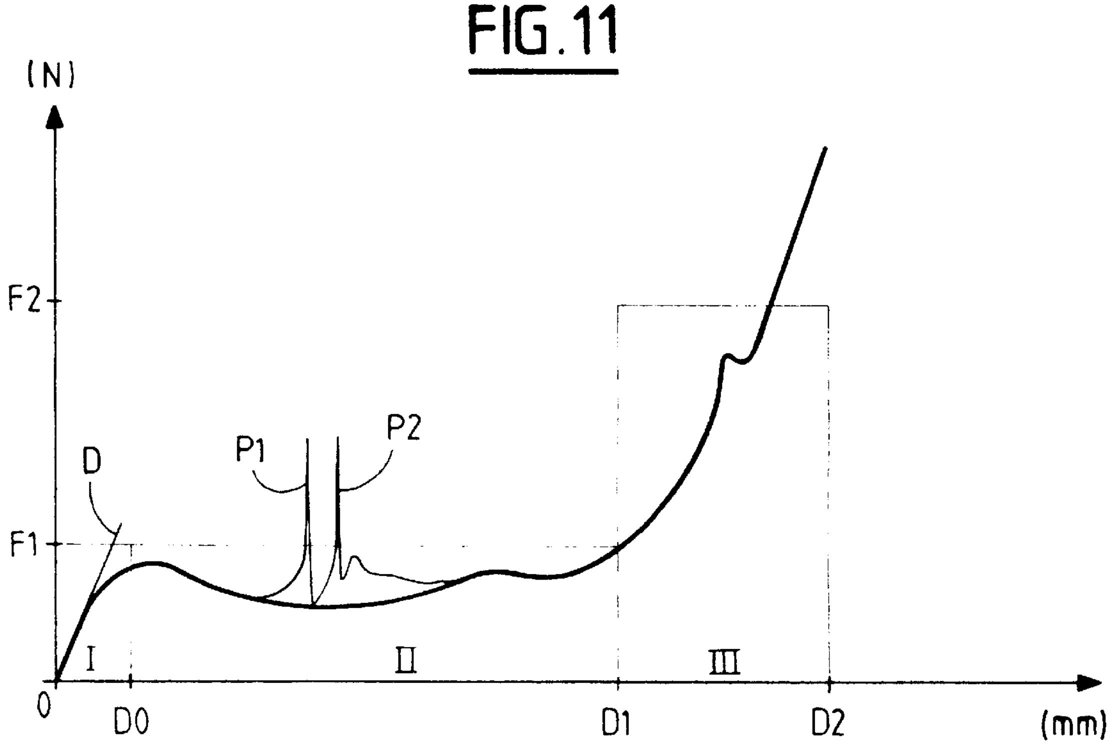
FIG. 11 represents examples of anomalies which can arise during the insertion of a pin, which feature on said curve obtained and which are corrected by said machine.

Represented on the curve C of FIG. 11, similar to that illustrated in FIG. 10, are anomalies likely to appear during the insertion in the areas I and II. For example, in the area I, the pin may be applied to the rear transverse face 5A of the connector and, more particularly, to an elastomeric seal fixed to this face, in the case of parallel offset of this pin with respect to the housing, which does not allow the articulation with ball joint to be compensated for in order to "reposition" the pin toward its housing. In this case, the axial springs 24A compress through the advancement of the insertion tool, until the forces measured by means of the gauge 30 reach, along the straight line D represented, the permissible force threshold F1. Moving equipment 7 then immediately halts its progression then moves back so that the operator is thus warned of the anomaly and carries out the necessary corrections before reinitiating the connecting cycle.

In the area II, the pin during insertion may become immobilized owing to a hard spot P1. The axial springs 24A compress until the forces measured by the gauge reach the threshold F1. The moving equipment stops its progression, then the device makes a rotation about the axis of insertion (rotation with respect to the ball joint 22B of the articulation). If the pin manages to free itself, the mechanical energy stored up by the springs is restored, so that the pin is then inserted into the housing. The forces measured again become lower than the threshold F1, the head of the moving equipment resumes its normal progression along the axis of insertion OZ. If, after this first rotation, the pin is still not free, then corresponding to a new hard spot P2, the head moves back axially a little way in order to decrease the energy stored up by the springs, and another rotation is then undertaken until the moment when the pin manages to get through the hard spot. Then, when the pin comes into contact with the internal shoulder of the housing, the elastic springs compress and, as soon as the forces measured via the gauge reach the threshold F2, the head of the moving equipment halts its progression and then disengages the tool by moving back axially. At this moment, the aforementioned retention test is carried out.

I claim:

1. A machine for automatically inserting connection elements into housings of connectors, said machine comprising:

- a supporting structure for supporting one of said connectors;
- moving equipment linked to said supporting structure and capable of moving along three axes of an orthonormal reference frame;
- a connecting device operatively coupled to said moving equipment for inserting one of said connection elements into one of said housings in an insertion direction, said connecting device comprising:
  - a body which is movable in said insertion direction;
  - an insertion tool supported by said body via removable linkage means, said insertion tool being provided with means for gripping said one connection element, said gripping means being operable between an open position and a closed position in which said one connection element is gripped by said gripping means; and
  - means for causing said gripping means to change between said open position and said closed position;
- means coupled to said supporting structure for holding at least one additional insertion tool, said additional insertion tool being adapted to be supported by said body; and
- a programmable control unit for controlling said moving equipment and said connecting device,
- wherein said connecting device additionally comprises elastic means located between said insertion tool and said gripping means for providing an elastic force in said insertion direction, wherein said removable linkage means have an articulation with a center of rotation which is substantially coincident with said insertion direction, and wherein said connecting device additionally comprises indexing means for acting on said articulation to align said insertion tool with said body.

2. The machine as claimed in claim 1, additionally comprising viewing means mounted on said moving equipment for identifying said connectors and determining coordinates of said housings, said viewing means comprising at least one camera linked to said programmable control unit.

3.The machine as claimed in claim 1 wherein said moving equipment comprises:

- a head slidably mounted along a Z-axis of said reference frame, said head carrying said connecting device;
- a slide on which said head is located, said slide being slidably mounted along a Y-axis of said reference frame; and
- a beam on which said slide is movable, said beam being slidably mounted along an X-axis of said reference frame on two guide rails which are fixed to said supporting structure.

4. The machine as claimed in claim 1, additionally comprising a plurality of elastic clips for receiving a plurality of cables.

5. A machine for automatically inserting connection elements into housings of connectors, said machine comprising:

a supporting structure for supporting one of said connectors;

moving equipment linked to said supporting structure and capable of moving along three axes of an orthonormal reference frame;

a connecting device operatively coupled to said moving equipment for inserting one of said connection elements into one of said housings in an insertion direction, said connecting device comprising:

a body which is movable in said insertion direction;

an insertion tool supported by said body via removable linkage means, said insertion tool being provided with means for gripping said one connection element, said gripping means being operable between an open position and a closed position in which said one connection element is gripped by said gripping means; and means for causing said gripping means to change between said open position and said closed position;

means coupled to said supporting structure for holding at least one additional insertion tool, said additional insertion tool being adapted to be supported by said body;

a programmable control unit for controlling said moving equipment and said connecting device; and a strain gauge attached to said body of said connecting device.

6. The machine as claimed in claim 5, additionally comprising viewing means mounted on said moving equipment for identifying said connectors and determining coordinates of said housings, said viewing means comprising at least one camera linked to said programmable control unit.

7. The machine as claimed in claim 5 wherein said moving equipment comprises:

a head slidably mounted along a Z-axis of said reference frame, said head carrying said connecting device;

a slide on which said head is located, said slide being slidably mounted along a Y-axis of said reference frame; and a beam on which said slide is movable, said beam being slidably mounted along an X-axis of said reference frame on two guide rails which are fixed to said supporting structure.

8. The machine as claimed in claim 5, additionally comprising a plurality of elastic clips for receiving a plurality of cables.

9. A machine for automatically inserting connection elements into housings of connectors, said machine comprising:

a supporting structure for supporting one of said connectors;

moving equipment linked to said supporting structure and capable of moving along three axes of an orthonormal reference frame;

a connecting device operatively coupled to said moving equipment for inserting one of said connection elements into one of said housings in an insertion direction, said connecting device comprising:

a body which is movable in said insertion direction;

an insertion tool supported by said body via removable linkage means, said insertion tool being provided with means for gripping said one connection element, said gripping means being operable between an open position and a closed position in which said one connection element is gripped by said gripping means; and means for causing said gripping means to change between said open position and said closed position;

means coupled to said supporting structure for holding at least one additional insertion tool, said additional insertion tool being adapted to be supported by said body;

a programmable control unit for controlling said moving equipment and said connecting device; and a mechanism for moving apart a plurality of cables, said mechanism being slidably mounted on said moving equipment and having a member in the form of a funnel which is capable of having said one connection element carried by the gripping means passed through said member.

10. The machine as claimed in claim 9, additionally comprising viewing means mounted on said moving equipment for identifying said connectors and determining coordinates of said housings, said viewing means comprising at least one camera linked to said programmable control unit.

11. The machine as claimed in claim 9 wherein said moving equipment comprises:

a head slidably mounted along a Z-axis of said reference frame, said head carrying said connecting device;

a slide on which said head is located, said slide being slidably mounted along a Y-axis of said reference frame; and a beam on which said slide is movable, said beam being slidably mounted along an X-axis of said reference frame on two guide rails which are fixed to said supporting structure.

12. The machine as claimed in claim 9, additionally comprising a plurality of elastic clips for receiving a plurality of cables.

* * * * *